United States Patent [19]
Polidori

[11] Patent Number: 6,132,291
[45] Date of Patent: Oct. 17, 2000

[54] SPECIFIC HEAT TREATING PROCESS THAT SIGNIFICANTLY ALTERS LYTHIC AND RELATED MATERIALS

[76] Inventor: Anthony Polidori, 1507 Rivershores Way, Tampa, Fla. 33603

[21] Appl. No.: 09/053,983

[22] Filed: Apr. 2, 1998

[51] Int. Cl.[7] .................................................. B24B 1/00
[52] U.S. Cl. .................................. 451/33; 451/53; 125/1; 125/30.01
[58] Field of Search ....................... 125/1, 30.01; 451/53, 451/33

[56] References Cited

U.S. PATENT DOCUMENTS

| | | | |
|---|---|---|---|
| 2,655,909 | 10/1953 | Aitchison et al. | 125/1 |
| 2,781,754 | 2/1957 | Aitchison et al. | 125/1 |
| 4,300,417 | 11/1981 | Veldkamp | 451/53 |
| 5,211,156 | 5/1993 | Jurwicz | 125/1 |

*Primary Examiner*—M. Rachuba

[57] ABSTRACT

A method of treating stone that produces dramatic natural changes by the use of heat only, the dramatic changes being, deeper more brilliant colors, smoother texture, richer luster, and easier workability. This method first includes; Providing stone material, then with or without a sand bath, placing the stone material in a heat treating environment, increasing the temperature in specific increments until the effective heat treating temperature is reached, keeping the stone at that temperature until all the desired changes have occured, the temperature is then decreased in specific increments until the material is at room temperature. Once the stone is treated and cooled, it is ready to be shaped, and or polished. Flaked into a desired shape.

1 Claim, No Drawings

SPECIFIC HEAT TREATING PROCESS THAT SIGNIFICANTLY ALTERS LYTHIC AND RELATED MATERIALS

BACKGROUND

1. Field of the Invention

Generally, this invention is directed towards a method of treating lythic materials such as stone, agate, flint Jasper and the like. More specifically, this method heat treats lythic materials for increasing the workability and increasing the natural luster of the material for use in a plurality of esthetically appealing applications.

2. Description of the Prior Art

Heat treatment of stores has been used for many years by prehistoric people and American Indians for increasing the workability of stones so that they could be shaped into arrowheads and other useful tools. Stone materials have been known to be affected by hot and cold temperatures for many years, for example crazing, pot-lid fracturing, and frost-pitting are well known to archaeologists. It has been assumed that prehistoric people created flaked stones by dripping cold water onto the stones when they were in a very high temperature state. Many stone materials that have already been heat-treated are readily workable such as volcanic rocks, ignimbrite and obsidian, opolites, and certain jaspers and agates. Stone materials in their native state tend to be extremely difficult to pressure flake, rough and inelastic, but if these materials are heat treated properly, the workability will dramatically increase as a result of the heat treatment. It has also been observed that heat treatment of these stones tends to produce a distinct change in color and a dramatic increase in luster depending upon the type of stone. It has been observed under electron microscopes that heat treatment of stones tend to cause recrystallization of the coarsely fibered and coarser micro-granular silicas materials, which results in reduced crystal size, Ft change in luster from dull to greasy, and an increase in the elasticity of the material. It would be well received if a method were introduced that would enable these stones to treated in such a way that would enable industry to combine these treated stones with esthetic applications.

Several approaches have been provided for the treatment of materials with heat, in U.S. Pat. No. 5,333,338 a process for treating textiles describes, "An enzyme bath maintenance system is provided for use in such textile treating fields as stonewashing, laundry, cleaning and dying, including the use of enzymes as the active agent, in which the enzymes are utilized within narrowly controlled ranges of pH and temperature. As a means for providing heat for controlling the temperature, a heat exchanger in which the heat source is hot water at a temperature not more than 12.degree. C. higher than that of the desired temperature is disposed within the apparatus. The heat exchanger and the apparatus as a whole are resigned to avoid pockets, which allow the enzyme to become entrapped therein. The apparatus further includes automated means for detecting, monitoring ard reporting bath parameters such as pH and temperature, with output for manual or automatic control thereof, and means for agitating the enzyme bath to maintain uniform distribution of the enzyme."

In the art taught by U.S. Pat. No. 5,275,978, "A crystallized glass article having a surface pattern like granite, marble or other natural stones with a line pattern of desired color or colors, which is formed by fusion bonding small masses of crystallizable glass material mixed with inorganic pigment powder at a heat-treating temperature higher than the softening point. The surface pattern comprises crystallized glass areas defined by the small masses in the surface layer of the article and the colored line pattern defined by the pigment dispersed in the interfaces between adjacent ones of the small masses in the surface layer."

While some of the prior art may contain some similarities relating to the present invention, none of them teach, suggest or include all of the advantages and unique features of treating stone like materials in the unique way as the invention disclosed herein.

For the foregoing reasons, there is a need for a method to treat stone like materials that will increase the workability and luster such that the stone materials can be used for esthetically appealing applications.

SUMMARY

The present invention is directed towards a method of treating stone like materials such that the workability, color and luster of the stones are dramatically increased such that the stones can be used in a multiplicity of esthetically appealing applications without the use of dyes pigments or acids but with naturally controlled heat only. The stones are normally first cut into slabs using a diamond saw or spalled to the desired thickness.

The thickness of the stone slabs is important and dependent upon the type of stone being treated. The stones are then slowly heat treated in gradual steps of raising temperatures until a desired temperature is reached dependent upon the stone material being treated. The stones are then continued to be heat treated for a given period of time also dependent upon the type of stone being treated. Once the time period for heat treatment has expired, the stone is then gradually cooled in small increments of temperature mirroring the raising temperature during initial heating. Once the stones have finally cooled to ambient temperatures, the stones are then shaped accordingly for their application.

Accordingly, it is an object of this invention to provide a method of treating stone like materials that will increase the workability of the stone.

Another object of this invention is to provide a method of treating stone like materials that will change the color and luster of the stone into a more vibrant desired state.

Other objects and a fuller understanding of the invention will become apparent from reading the following detailed description of a preferred embodiment in conjunction with the accompanying drawings.

DESCRIPTION OF THE PREFERRED EMBODIMENTS

Referring now to the process in treating these stones, here is a short list of stones that can be treated with the method described herein, however, other stones cold also be treated using this method.

Brazilian and other forms of Agates
Jaspers
Cherts
Chalcedony
Flints
Agatized materials such as Florida and Georgia Coral
Petrified Wood In carrying out this invention in the illustrative embodiment thereof, a person first takes a stone sample and cleans off all excess debris. The stone is then cut into slabs using a diamond-cutting blade or spalled to whatever desired thickness is needed. The thickness of these slabs or spalls depends upon the type of stone being cut. The thickness of these slabs and their uniformity is crucial for the heating process. If the stone slabs are not thin enough, they will not accept heat treatment well and can easily pot-lid or explode. This happens quite often, especially when the stones are left in nodule form. This is normally due to trapped moisture or other rapidly expanding materials that are trapped deep inside the stone. Cutting the stones into thin slabs allows the stone slabs to be evenly and uniformly treated with heat and will also allow moisture and other gases to escape easily without causing cracks or breaking the stone slabs.

Once the stone slabs have been cut into a desired thickness, they are then placed inside an oven whereupon the temperature is slowly raised in increments every hour. Note, only similar types of stones are placed inside the oven at a time because different stones require different temperature ranges and different periods of time. The stone slabs should also be placed inside of an oven whereby heat is uniformly radiating the surface area of the stone slabs. A further modification is to place the stone slabs into a sand bath about 2 to 3 inches deep, this method will further give uniform heat treatment to the stone and prevent any sudden temperature changes that could damage the stone slabs. The increments of temperature increase is normally between 10 and 50 degrees Fahrenheit per hour depending upon the types of stone that are being treated. If the temperature is raised too quickly, the moisture or other gases inside of the stone could expand too quickly and break or damage the stone slabs.

Once the stones have reached the desired temperature, they are maintained at this temperature for a period of time ranging from 8 to 24 hours again depending upon the types of stones being treated. The desired final temperature is normally between 300 and 1200 degrees Fahrenheit, again this depends upon the types of stones being treated. A person can tell if a stone is ready for shaping by removing one stone and chipping off a piece, if the stone contains a shiny luster where the chip was removed, then the stone has been sufficiently heat treated. If not, then the time period for heating the stone needs to be increased or the temperature needs to be increased or a combination of the two.

The reverse process is then used to cool the stone slabs until they reach room temperature. The stone slabs are now ready to be shaped according to their application. Some applications include Decorating Tiffany style lamps, using the stone slabs for gun handle inserts, rings, knife handles, carved figures or any other type of esthetic application.

Accordingly, a very unique, and convenient method are provided for treating stone materials that will increase the vibrant colors, increase the luster, smooth the texture, and increase the workability of the stone.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A method of treating stone material for changing the texture, increasing the workability, increasing the luster, and for effecting brilliant color changes in the stone, said method comprising of:
    (a) providing stone material for the treating process;
    (b) heating said stone material between 150 and 2400 degrees fahranheit at specific increments of between 10 and 50 degrees fahrenheit per hour until a treating temperature is reached;
    (c) maintaining said stone material at a treating temperature for a proper length of time of between 2 and 72 hours until said workability, said luster, said texture and said color changes are completed;
    (d) cooling said stone material in specific increments of between 10 and 50 degrees fahrenheit per hour until said stone material reaches room temperature;
    (e) shaping said stone material;
    (f) flaking said stone material; and
    (g) polishing said stone material.

\* \* \* \* \*